United States Patent [19]

Sakagami

[11] Patent Number: 4,870,634
[45] Date of Patent: Sep. 26, 1989

[54] APPARATUS FOR RECORDING AND/OR REPRODUCING INFORMATION DATA AND A SIGNAL FOR SYNCHRONIZING THE SAME

[75] Inventor: Wataru Sakagami, Yokohama, Japan
[73] Assignee: Canon Kabushiki Kaisha, Tokyo, Japan
[21] Appl. No.: 64,016
[22] Filed: Jun. 19, 1987
[30] Foreign Application Priority Data
  Jun. 23, 1986 [JP] Japan .................................. 61-147801
[51] Int. Cl.$^4$ ............................................... G11B 7/00
[52] U.S. Cl. ......................................... 369/47; 369/32; 235/454; 235/487
[58] Field of Search ................. 358/342; 235/454, 487; 360/2, 27, 39, 48, 49, 77; 369/32, 33, 47, 48, 54, 59

[56] References Cited
U.S. PATENT DOCUMENTS
  4,737,869 4/1988 Sugaya et al. ........................ 360/77

Primary Examiner—Robert L. Richardson
Attorney, Agent, or Firm—Fitzpatrick, Cella, Harper & Scinto

[57] ABSTRACT

An information recording apparatus comprises: a device to record information into a recording medium such as an optical card; a generator to generate a pattern signal for synchronization of the recording information, this generator being able to generate an arbitrary pattern; a controller for adding the pattern signal to the recording information and for recording the information and the pattern signal into the recording medium; and a host computer for transmitting and receiving the recording information to and from the information recording apparatus. The pattern signal is added in front of the recording information and another pattern signal is added after the recording information. This another pattern signal is derived by reversely rearranging the pattern signal added in front of the recording information. A discriminating signal is interposed between the recording information and the pattern signal. The host computer can arbitrarily set a pattern of the pattern signal. With this apparatus, the security of the recorded information is held.

21 Claims, 9 Drawing Sheets

APPARATUS FOR RECORDING AND/OR REPRODUCING INFORMATION DATA AND A SIGNAL FOR SYNCHRONIZING THE SAME

BACKGROUND OF THE INVENTION

1. Field of the Invention

The present invention relates to an apparatus for recording and reproducing information.

2. Related Background Art

Hitherto, various kinds of disc-shaped medium, card-shaped medium, and the like have been known as forms of media to record information using a light and to read out the recorded information. Among them, the card-shaped optical information recording medium (hereinafter, referred to as an optical card) is a small and light weight portable medium having a large recording capacity.

An apparatus for recording and reproducing information into/from the foregoing optical card, is disclosed in U.S. Application No. 810,747.

Figure 3:
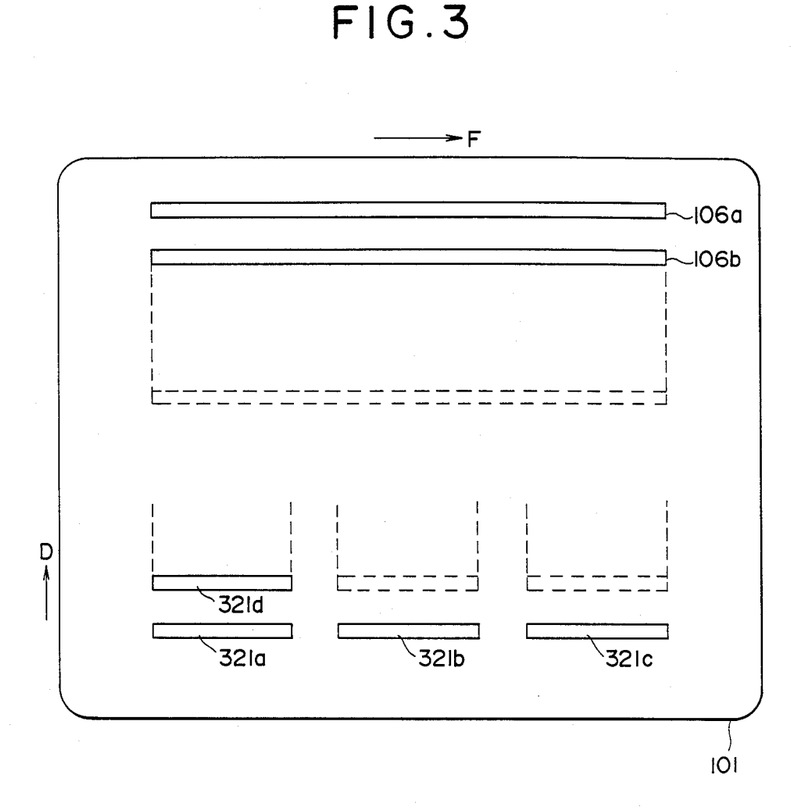
FIG. 3 is a diagram showing an outline of a format of an optical card.

FIG. 3 is a schematic plan view of an optical card, in which reference numeral 101 denotes a recording medium, 106 (106a106b, . . .) indicates an information track, and 321 (321a, 321b, 321c, 321d, . . .) represents a directory.

In the foregoing optical card, information is recorded as a recording pit train (information track) which can be optically detected by scanning the card by use of a laser beam modulated in accordance with recording information and focused a microspot.

Due to the popularity of the optical card, the optical card is used in various kinds of applications. However, in this case, the optical card needs to be protected when it is used in a different application, namely, the recording and reproducing operation needs to be disabled. In general, in such a case, an ID (identification) code is preliminarily recorded in the data section and when the ID code input by the user does not coincide with the recorded ID code, the medium used in the different system is not accepted. However, such a protection is not executed in the recording and reproducing apparatus but, in general, it is executed in a host control unit (on the side of a host computer) which is connected to this apparatus.

Therefore, a problem hardly occurs when the ordinary user cannot operate the host control unit as in the case of a card system of a bank. However, in the case of a system such that the host control unit uses a personal computer, the user can relatively easily examine the ID code and the like, so that there is a danger such that the protection is easily broken.

SUMMARY OF THE INVENTION

It is an object of the present invention to provide an information recording and reproducing apparatus which can eliminate the foregoing drawbacks.

Another object of the invention is to provide an improved information recording and reproducing apparatus.

Still another object of the invention is to provide an information recording and reproducing apparatus in which it is difficult to break the protection.

Still another object of the invention is to provide an information recording apparatus which can arbitrarily set a pull-in signal.

Still another object of the invention is to provide an information reproducing apparatus which can protect the security of the recorded information.

The above and other objects and features of the present invention will become apparent from the following detailed description and the appended claims with reference to the accompanying drawings.

DETAILED DESCRIPTION OF A PREFERRED EMBODIMENT

An embodiment of the present invention will be described in detail hereinbelow with reference to the drawings.

Figure 1A:
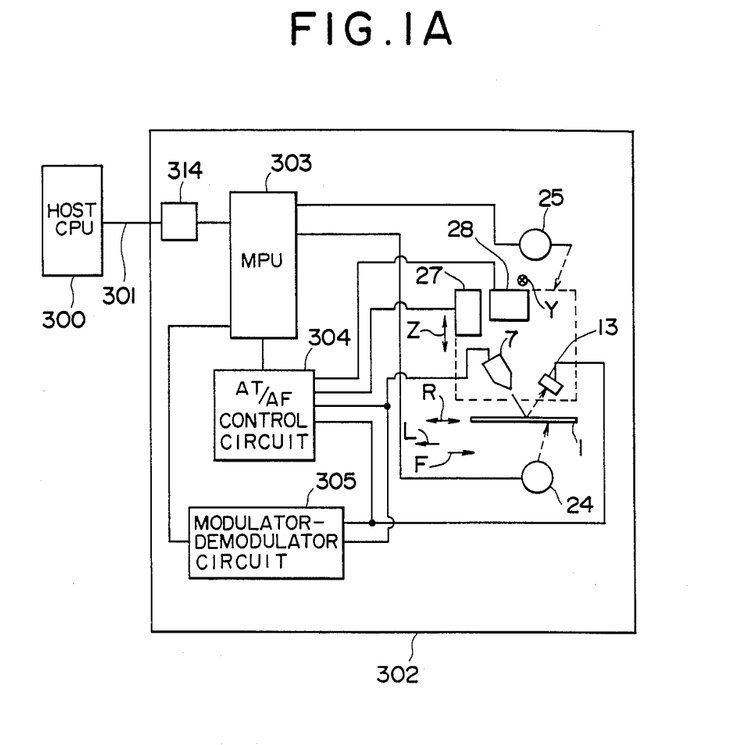
FIGS. 1A and 1B are block diagrams showing a constitution of an information recording and reproducing apparatus.
Figure 1B:
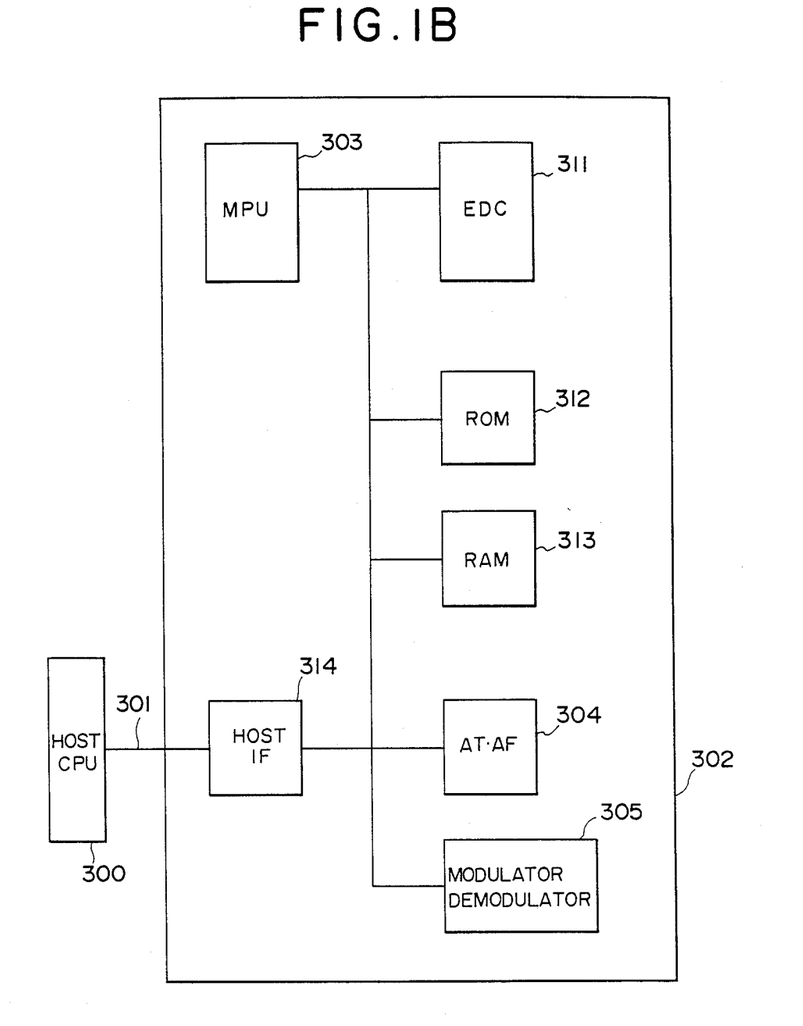

FIGS. 1A and 1B are block diagrams showing a constitution of an optical information recording and reproducing apparatus using an optical card.

An information recording and reproducing apparatus (hereinafter, referred to as a drive) 302 is connected to a host control unit (hereinafter, referred to as a host CPU) 300 and performs the data communication, control, and the like between the drive 302 and the CPU 300 through an interface 314. An MPU 303 in the drive 302 includes therein an ROM 312 and an RAM 313 and mainly controls a card feed motor 24 and head feed motor 25. A control program and control data are stored in the ROM 312. An AT/AF control circuit 304 receives a detection signal from a photo detector 13 and drives an AF actuator 27 and an AT actuator 28. A modulator-demodulator circuit 305 executes the recording by changing a light emission intensity of a light source 7 in the recording mode and demodulates data on the basis of the detection signal of the photo detector 13 in the reproducing mode.

Reference numeral 311 denotes a circuit to detect and correct an error in data to be recorded into an optical card 1 and in the data read out from the card 1, and 301 denotes a signal line to connect the host CPU 300 with the drive 302.

The AT/AF control circuit 304 controls the irradiating position of a laser beam in the direction perpendicular to the scanning direction (this control is the auto tracking and will be referred to as an AT hereinafter) in order to accurately record and reproduce information without encountering problems such as a crossing of the information track 106 or the like. In addition, the AT/AF control circuit 304 controls the irradiating position of the laser beam in the direction perpendicular to the optical card (this control is the auto focusing and will be referred to as an AF hereinafter) in order to stably irradiate the microspot irrespective of the bending and mechanical error of the optical card.

Figure 2:
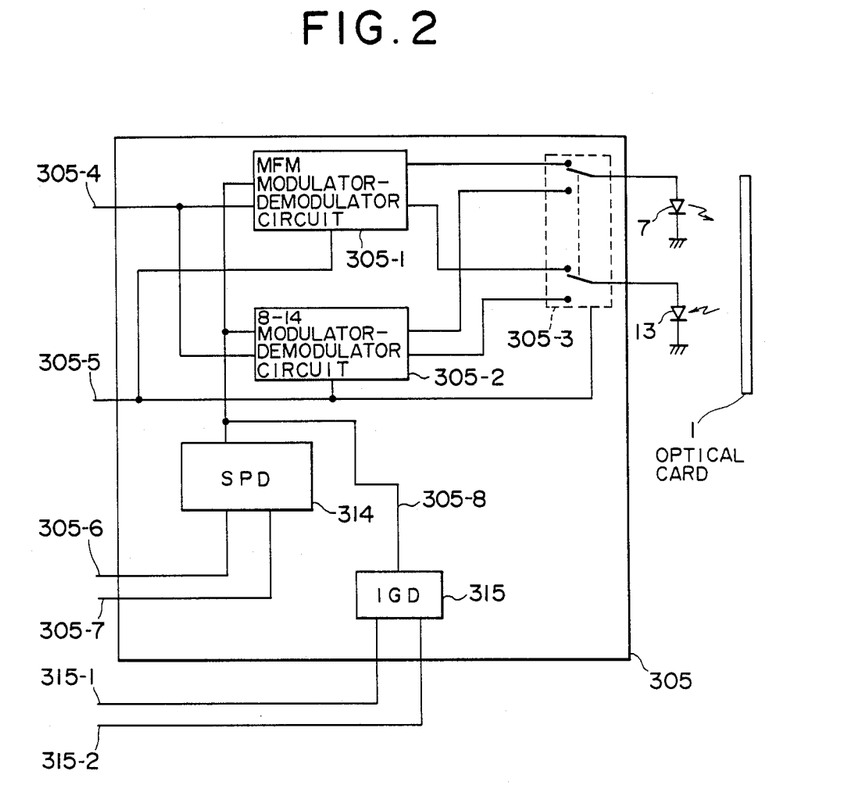
FIG. 2 is a block diagram showing a constitution of a modulator-demodulator circuit.

FIG. 2 is a detailed explanatory diagram of the modulator-demodulator circuit 305 (hereinafter, referred to as an R/W circuit), which will be explained in FIGS. 1A and 1B. Reference numeral 305-1 denotes a modulator-demodulator circuit for MFM (modified frequency modulation) and 305-2 indicates an 8-14 modulator-demodulator circuit. The MPU 303 controls a switching signal 305-5 and switches a switch 305-3 in accordance with the type of the optical card employed.

For example, when the switching signal 305-5 is set to the high level, the MFM modulator-demodulator circuit 305-1 is selected. When it is set to the low level, the 8-14 modulator-demodulator circuit 305-2 is selected.

A recording signal 305-4 from the MPU 303 is supplied to the MFM modulator-demodulator circuit 305-1 and 8-14 modulator-demodulator circuit 305-2 and modulated. The modulated signals drive the optical device (laser diode) 7. On the other hand, a demodulated signal 305-8 is a bit-serial signal. Either one of the circuits 305-1 and 305-2 is selected by the switching signal 305-5. The output signal of the selected circuit is supplied to a synchronization (sync) signal detecting circuit 314 (hereinafter, referred to as an SPD) and to a gap detector 315 (hereinafter, referred to as an IGD) to detect a gap of the directory section in one track.

In any of the modulation and demodulation systems of the optical card to which the invention is applied excluding an auxiliary track (provided among the information tracks 106) to perform the tracking, a self clock can be performed.

Therefore, an ordinary PLL circuit is used to form a sync clock. Even when a signal is suddenly input in the non-signal state, the PLL circuit cannot generate an accurate clock pulse; therefore, a pull-in signal and a pull-in setting time are necessary. For example, in the case of a floppy disk, about eight bytes are generally used.

Figure 4:
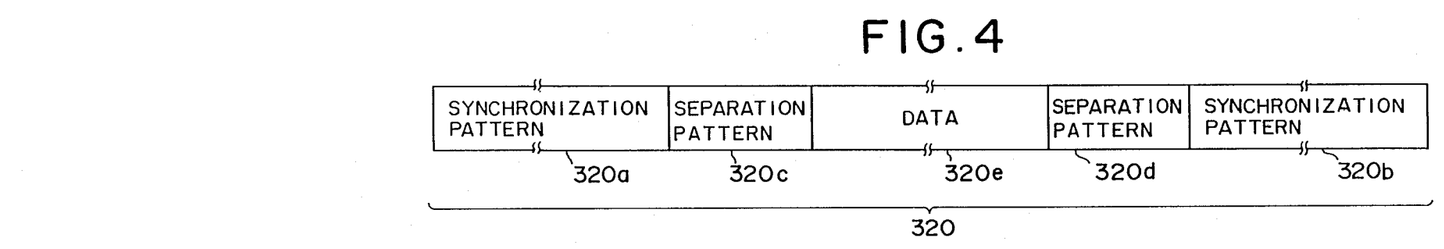
FIGS. 4, 5, 6 and 8 are diagrams showing constitutions of data sections.

A medium for use in the optical card system to which the invention is applied is a write-once type medium and has a constitution such that information is recorded and reproduce by reciprocating the medium. Therefore, as in a floppy-disk which rotates in one direction, synchronizing data is necessary for not only the head portion of the data section but also the data end portion in order to synchronize the data in the returning motion. FIG. 4 is a diagram for explaining this situation. A whole data section 320 comprises: data section 320e; separation patterns 320c and 320d arranged on both sides of the data section 320e; and synchronization patterns 320a and 320b arranged in the outsides of the separation bytes 320c and 320d.

The separation patterns 320c and 320d are provided to separate the synchronization patterns from the data. In the case of a floppy disk or the like, these portions ordinarily are gaps (i.e., non-signal) and by detecting the gap, the synchronization pattern section and the data section can be separated. However, in the case of an optical card, such a gap system is improper because a non-signal state easily occurs by a scratch, dust, or the like. Therefore, the synchronization pattern and the data are continuously arranged and the separation pattern is interposed therebetween, thereby enabling the data section and the synchronization pattern to be separated.

Figure 5:
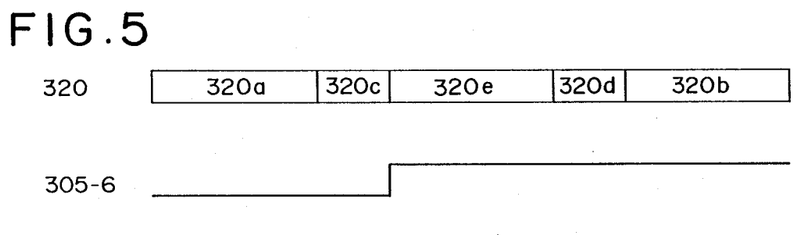
Figure 6:
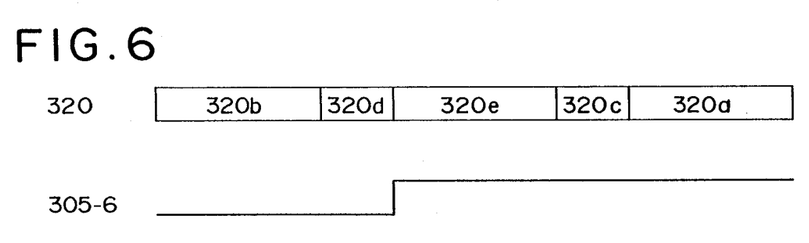
Figure 7:
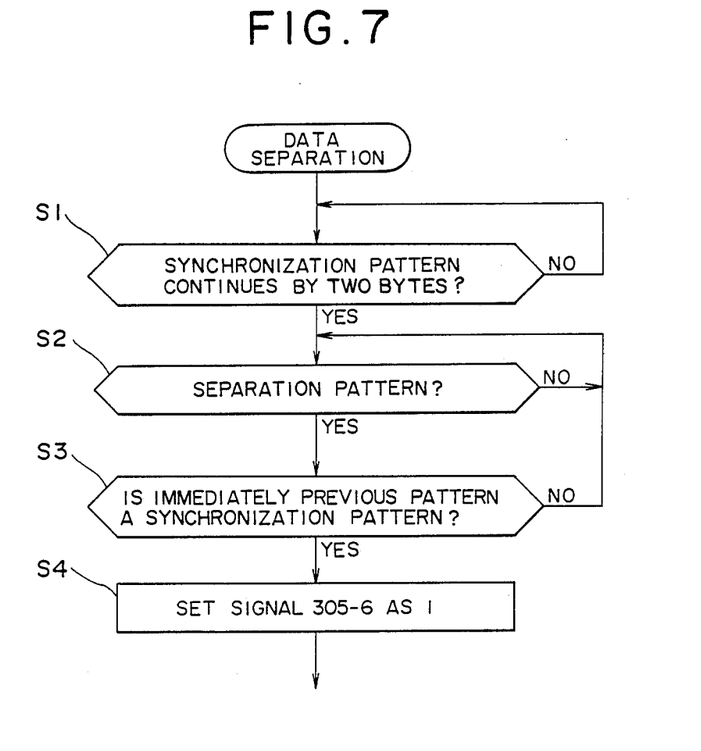
FIG. 7 is a flowchart showing the operation when data is separated.
Figure 8:
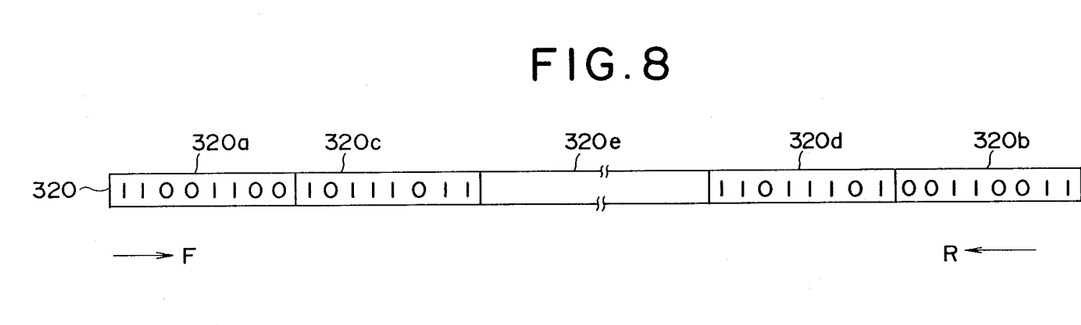

The operation of the sync pattern detecting circuit (SPD) 314 shown in FIG. 2 will now be described with reference to FIGS. 5 to 7. A check is made by a coincidence circuit (not shown) in the SPD 314 to see if the synchronization pattern has continued by two bytes or not (step 1). If YES, a check is made to see if the separation pattern bas been detected or not (step 2). If YES, when the immediately previous pattern is the sync pattern, a signal 305-6 is set to "1" (steps 3 and 4). The MPU 303 allows a serial/parallel converter (not shown) to convert the serial data 320e into the parallel data and thereafter, stores the converted parallel data into a memory every byte only when the signal 305-6 is set to "1". As mentioned above, since the apparatus is constituted so as to record and reproduce information by reciprocating the medium, when the data recorded in the track is read out in the opposite direction, the normal sync pattern cannot be detected. The present invention is made to eliminate the above drawback. As shown in FIG. 8, the constitution when the sync pattern and separation pattern were seen from the F direction is equalized with the constitution when they were seen from the R direction. In other words, by constituting the bit symmetrical pattern whose right and left constitutions are symmetrical with respect to the data section 320e as a center, even if the data was read out from the R direction, the sync pattern and the data can be accurately separated as will be explained in conjunction with FIG. 6.

Further, the pull-in operation of the PLL circuit is stably performed if the patterns are the same. Therefore, such a symmetrical pattern is also very effective from this point.

On the other hand, since the value of the sync pattern can be arbitrarily set on the host side, it is possible to make the sync patterns different in accordance with the use object and to record.

Further, if the comparison data of the coincidence circuit (not shown) in the SPD 314 in FIG. 2 can be set from the outside, it can be used to protect a card.

This constitution will now be described in detail. For example, when the sync pattern is set to AA (hexadecimal notation) in the card system which is used in A Co., Ltd. and the sync pattern is set to 55 (hexadecimal notation) in the card system which is used in B Co., Ltd., even if the card of the B Co., Ltd. is set into the recording and reproducing apparatus which is used in the card system of A Co., Ltd., the sync pattern is not coincident with the comparison data of the coincidence circuit, so that the synchronization is not obtained and the recorded data cannot be read out. Consequently, the security of the data can be protected.

On the other hand, if the separation pattern can be also varied, there is an advantage such that a number of combinations consisting of the sync pattern and the separation pattern can be realized Further, even in the case of the same system, for example, 33 (hexadecimal notation) is used for the data which is used in a system program and CC (hexadecimal notation) is used for the user's data, thereby enabling the readout of the system program by the user to be prevented. When distinguishing the data for the system program from the user's data, it is sufficient to discriminate the system program from the user's data, for example, as a part of directory information. Namely, after the host computer reads out the directory, by setting the value of the sync pattern in accordance with the directory information, the readout of the system program section from the user's program can be disabled. This process will be explained in detail with reference to FIGS. 1A to 1C, 2, and 3. FIG. 3 shows an embodiment in which the directory section and data section were recorded. Assuming that the data section 106a is the system data and the data section 106b is the user's data section, the directory 321a corresponds to the data section 106a and the directory 321b corresponds to the data section 106b, respectively. When the CPU 300 outputs a command to read out the directory section, the directory stored in the RAM in the CPU 300 is developed as shown in FIG. 9.

Figure 9:
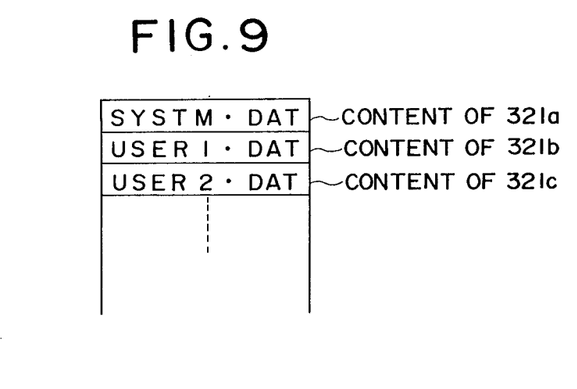
FIG. 9 is a diagram showing the content of a directory.

On the basis of the system program in the CPU 300, the CPU 300 outputs to the MPU 303 a command to set the sync pattern in accordance with the content of the directory in FIG. 9. The MPU 303 stores the set value into a register (not shown) in the SPD 314 in accordance with this command.

The command to set the sync pattern is kept secret for the user. After the directory is read out, the value of the sync pattern is set to the user's data side. In this way, even if a command to read out "SYSTM.DAT" in FIG. 9 from the user's program is output, no data is read out at all because the sync patterns are not coincident. Thus, the system data can be protected.

The foregoing data writing operation will now be described further in detail.

Figure 1C:
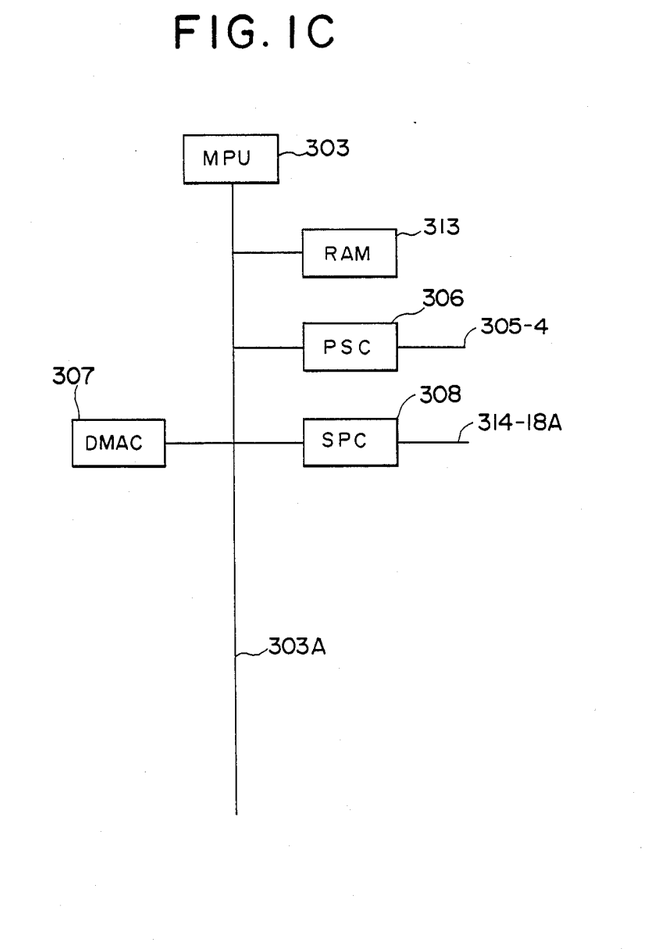
FIG. 1C is a partial detailed diagram of FIG. 1B.

FIG. 1C is a partial detailed diagram of FIG. 1B.

The data writing method will be explained with reference to FIGS. 1B, 1C, and 4. The MPU 303 sequentially stores a predetermined number of sync pattern 320a, separation byte 320c, data 320e, separation byte 320d, and sync pattern 320b into the RAM 313. Further, the MPU 303 sets a transfer data length, a transfer address, and the like to a DMAC (direct memory access controller) 307 and waits until the recording is started.

At the start of the recording of data, when the MPU 303 detects a recording start signal (not shown), the MPU 303 outputs a data transfer start command to a parallel/serial converter (PSC) 306. The PSC 306 operates to convert parallel data into the serial data and performs the handshaking function with the DMAC 307. When the PSC 306 detects a data transfer start command or a signal indicative of the start of the data transfer from the MPU 303, the signal 305-4 obtained by converting the parallel data as much as the length of the transfer data set in the DMAC 307 into the serial data is supplied to the modulator-demodulator circuit 305.

A serial/parallel converter (SPC) 308, which will be explained hereinafter, also has substantially the same function as the PSC 306 excluding that the data converting format is merely opposite to that of the PSC 306.

The end of data transfer can be recognized by examining the status in the DMAC 307 by the MPU 303.

Figure 10:
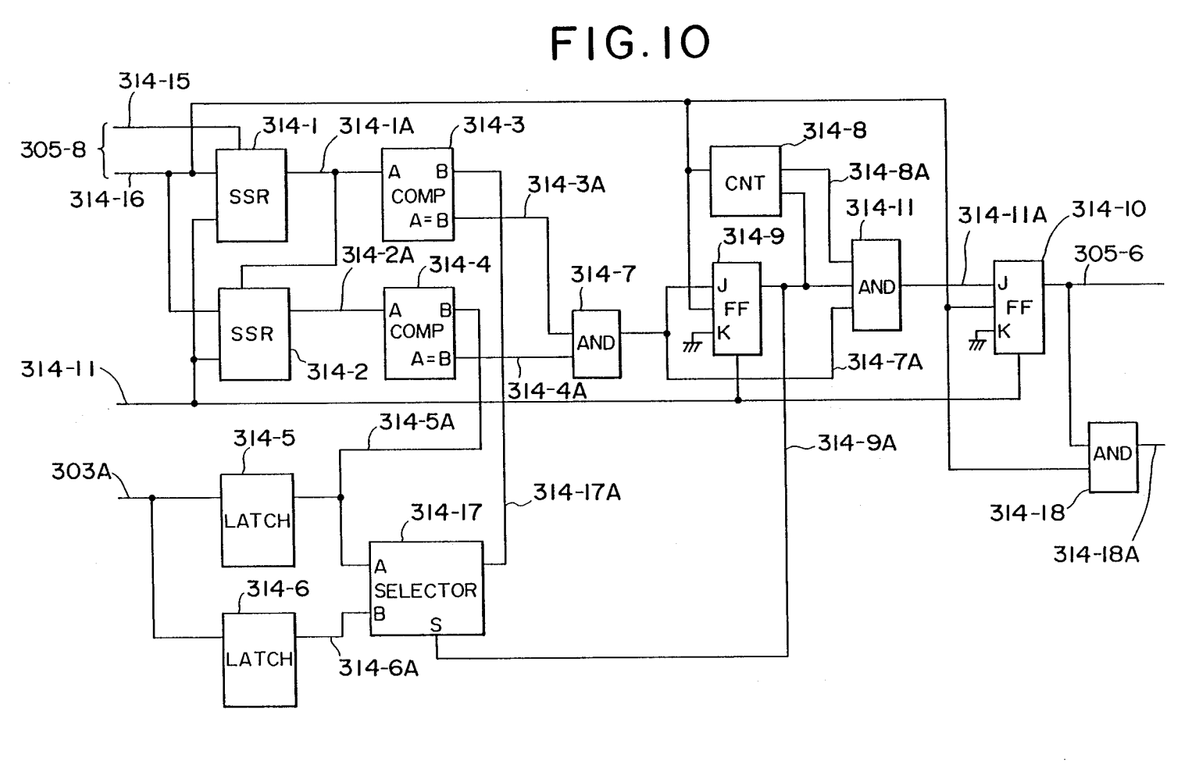
FIG. 10 is a partial detailed diagram of FIG. 2.

The data reading method will now be explained with reference to FIGS. 1C and 10. FIG. 10 shows an embodiment of the SPD 314 in the modulator-demodulator circuit 305 in FIG. 2 and relates to a circuit to extract the data section 320e from the data 320 (FIG. 4) recorded in the optical card 1.

In FIG. 10, the inputs of latch circuits 314-5 and 314-6 are connected to a data bus 303A of the MPU 303. The latch circuit 314-5 is used to store sync pattern data. The latch circuit 314-6 is used to store separation byte data. A demodulated signal 305-8 of the MFM modulator-demodulator circuit 305-1 or 8-14 modulator-demodulator circuit 305-2 in FIG. 2 includes the RFCK 314-16 as a synchronization clock for demodulated data 314-15 and demodulated data 314-15. Shift registers (SSRs) 314-1 and 314-2 are cascade connected and the parallel outputs of each shift register are connected to the A-side inputs of comparators 314-3 and 314-4. Prior to reading out data, the MPU 303 controls a reset signal 314-11 to reset the shift registers 314-1 and 314-2 and flip-flops 314-9 and 314-10. Further, the reset input of an octal counter 314-8 (having the same number of bits as the shift register) is connected to an output 314-9A of the flip-flop 314-9. When the flip-flop 314-9 is reset, the counter 314-8 is also reset.

On the other hand, the A-side input of a selector 314-17 is connected to an output 314-5A of the latch circuit 314-5 and the B-side input is connected to an output 314-6A of the latch circuit 314-6. An output 314-17A of the selector 314-17 is connected to the B-side input of the comparator 314-3 and an output switching terminal S is connected to the output 314-9A of the flip-flop 314-9. When the flip-flop 314-9 is reset, the A-side input is selected.

The operation will now be described with reference to a flowchart of FIG. 7.

STEP 1:

In the initial state, the same information as the output of the latch circuit 314-5 is input to the B-side inputs of the comparators 314-3 and 314-4. The demodulated data signal 314-15 is stored into the shift registers 314-1 and 314-2 synchronously with the RFCK 314-16. Outputs 314-3A and 314-4A of the comparators 314-3 and 314-4 are respectively set to "1" when the A-side input coincides with the B-side input.

Since the synchronization pattern 320a or 320b is stored in the latch circuit 314-5, when both outputs 314-3A and 314-4A are set to "1", this means that the sync pattern has continued by two bytes. If the above condition is satisfied, an output 314-7A of an AND gate 314-7 is set to "1".

STEP 2:

When the output 314-7A of the AND gate 314-7 is set to "1", the flip-flop 314-9 is set and the counter 314-8 starts operating and generates an overflow output 314-8A each time eight clocks RFCK 314-16 are counted. Namely, the counter 314-8 outputs a signal indicative of the boundary of the bytes. On the other hand, the output 314-9A of the flip-flop 314-9 is connected to the selecting terminal S of the selector 314-17. Therefore, when the flip-flop 314-9 is set, the output 314-17A of the selector has the same information as the output of the latch circuit 314-6.

Thus, when the output 314-3A of the comparator 314-3 is set to "1", this means that the readout data was the separation pattern.

STEP 3:

If the separation pattern was detected in step 2, the content of the shift register 314-2 is the immediately previous eight-bit data. Therefore, if the output of the shift register 314-2 is the same as the sync pattern, both conditions in steps 2 and 3 are satisfied.

STEP 4:

The AND gate 314-9 is the condition circuit to set the signal 305-6 to "1". When the boundary between the bytes is detected (i.e., the output 314-8A is set to "1"), this means that the sync pattern has already continued (the output 314-9A is set to "1"). The present data is the separation byte and the immediately previous data is the sync pattern (the output 314-7A is set to "1"). In this case, the output 314-9A of the AND gate 314-9 is set to "1". To keep this state, the flip-flop 314-10 is set by the output 314-9A of the AND gate.

Therefore, by calculating the AND of the output 305-6 of the flip-flop and the RFCK 314-16 by an AND gate 314-18, an output 314-18A of the AND gate 314-18 becomes the sync clock output from the head of the write data 320e in the demodulated signal 314-15.

The SPC 308 in FIG. 1C executes the serial/parallel conversion using the signal 314-18A and stores data into the RAM 313 in a DMA transfer manner. In the above description, the signal 305-6 is set to "1" at the head of the data 320e but is not set to "0" even after the end of the data 320e. This is because after the data as much as the set length of the transfer data of the DMAC 307 has been transferred, the DMA is not executed. Therefore, additional data (the separation byte and sync pattern subsequent to the data 320e) is not stored into the RAM 313.

As described above, by providing the latch circuits to set the sync pattern and/or separation byte data in the SPD 314, the sync pattern and separation byte data can be arbitrarily set by a program. At the same time, even if a medium in which the set combination of sync pattern and separation byte differs was reproduced, the data 320e is not stored into the RAM. Therefore, the host 300 cannot read out the data.

An example using the directory has been described above. In the case of another embodiment of application having no directory, the similar effect is also obtained by constituting such that the different track numbers are managed by the system program in the CPU 300, for example, by assigning the tracks 1 to 999 to the user's data section and by assigning the track 1000 and subsequent tracks to the system data section.

I claim:

1. An information recording apparatus for recording at least one synchronizing pull-in signal and information on a recording medium, comprising:
   input means for inputting information to be recorded on a recording medium;
   supplying means for supplying at least one synchronizing pull-in signal for synchronizing a readout operation of the information, said supplying means including means for providing at least one synchronizing pull-in signal with a desired pattern; and
   recording means for recording on the recording medium the information input by said input means while the at least one synchronizing pull-in signal supplied by said supplying means is added to the information input by said input means.

2. An apparatus according to claim 1, wherein said recording medium is an optical memory.

3. An apparatus according to claim 1, wherein said recording means is adapted to record the at least one synchronizing pull-in signal in front of the information with respect to a first direction of recording.

4. An apparatus according to claim 1, further having a host computer for transmitting and receiving the information to and from said information recording apparatus, and wherein said host computer produces the at least one synchronizing pull-in signal with a desired pattern.

5. An apparatus according to claim 1, wherein said recording means is adapted to record a first synchronizing pull-in signal in front of the information and a second synchronizing pull-in signal behind the information with respect to a direction of recording.

6. An apparatus according to claim 5, wherein patterns of the first and second synchronizing pull-in signals are symmetrical.

7. An apparatus according to claim 1, further comprising second supplying means for supplying a separation signal for separating the at least one synchronizing pull-in signal from the information, wherein said recording means is adapted to add and record the separation signal between the at least one synchronizing pull-in signal and the information.

8. An apparatus according to claim 7, wherein said second supplying means includes means for providing a separation signal with a desired pattern.

9. An apparatus according to claim 1, wherein said recording medium is in a shape of a card.

10. An apparatus according to claim 9, wherein said recording means is adapted to record information on the recording medium moving in a reciprocating manner relative to said recording means.

11. An apparatus according to claim 1, wherein said supplying means includes means for supplying a synchronizing pull-in signal with a different pattern for each recording block of the recording medium.

12. An apparatus according to claim 1, wherein said supplying means includes a PLL circuit.

13. An information reproducing apparatus for recording at least one synchronizing pull-in signal and information on a recording medium, comprising:
    reading means for reading out information and at least one synchronizing pull-in signal recorded on a recording medium, wherein the synchronizing pull-in signal is utilized to synchronize reproduction of the information;
    synchronizing means for synchronizing an information reproducing operation on the basis of the synchronizing pull-in signal read out by said reading means;
    comparing means for comparing a predetermined first pattern with a pattern of the synchronizing pull-in signal read out by said reading means; and
    control means for controlling the information reproducing operation such that said control means permits said reproduction of the information when said comparing means determines that the predetermined first pattern coincides with the pattern of the synchronizing pull-in signal, and that said control means prohibits reproduction of the information when said comparing means determines that the predetermined first pattern does not coincide with the pattern of the synchronizing pull-in signal.

14. An apparatus according to claim 13 wherein said recording medium is an optical memory.

15. An apparatus according to claim 13, wherein said reading means includes means for reading out a separation signal which has been recorded on said recording medium and which is utilized to separate the information from the synchronizing pull-in signal.

16. An apparatus according to claim 15, wherein said reading means is adapted to read out information from the recording medium moving in a reciprocating manner relative to the reading means.

17. An apparatus according to claim 15, further comprising second comparing means for comparing a predetermined second pattern with a pattern of the separation signal read out by said reading means, wherein said control means controls the information reproducing operation such that said control means prohibits reproduction of the information when said second comparing means determines that the predetermined second pattern does not coincide with the separation signal, and that said control means permits reproduction of the information when said second comparing means determines that said predetermined second pattern coincides with the separation pattern and comparing means determines that the predetermined first pattern coincides with the pattern of the synchronizing pull-in signal.

18. An apparatus according to claim 13, wherein said recording medium is in a shape of a card.

19. An apparatus according to claim 13, wherein said synchronizing means includes a PLL circuit.

20. An apparatus according to claim 13, further comprising means for supplying the predetermined pattern to said comparing means.

21. An apparatus according to claim 20, wherein said supplying means supplies a different pattern for each recording block of the recording medium.

* * * * *

UNITED STATES PATENT AND TRADEMARK OFFICE
CERTIFICATE OF CORRECTION

PATENT NO. : 4,870,634

DATED : September 26, 1989

INVENTOR(S) : Wataru Sakagami

It is certified that error appears in the above-identified patent and that said Letters Patent is hereby corrected as shown below:

COLUMN 3

Line 41, "reproduce" should read --reproduced--.

COLUMN 8

Line 46, "claim 13" should read --claim 13,--.

Signed and Sealed this

Second Day of July, 1991

Attest:

HARRY F. MANBECK, JR.

*Attesting Officer*    Commissioner of Patents and Trademarks